United States Patent [19]

Preisegger et al.

[11] Patent Number: 5,146,016
[45] Date of Patent: Sep. 8, 1992

[54] FILLER FOR SENSOR SYSTEMS OF TEMPERATURE-SENSITIVE DISPLACEMENT PICKUPS

[75] Inventors: Ewald Preisegger, Nauheim; Wolfgang Scholten, Hofheim am Taunus; Thomas Müller, Bad Homburg, all of Fed. Rep. of Germany

[73] Assignee: Hoechst Aktiengesellschaft, Fed. Rep. of Germany

[21] Appl. No.: 761,756

[22] PCT Filed: Mar. 16, 1990

[86] PCT No.: PCT/EP90/00429

§ 371 Date: Sep. 16, 1991

§ 102(e) Date: Sep. 16, 1991

[87] PCT Pub. No.: WO90/10853

PCT Pub. Date: Sep. 20, 1990

[30] Foreign Application Priority Data

Mar. 16, 1989 [DE] Fed. Rep. of Germany ....... 3908551

[51] Int. Cl.$^5$ .................... C07C 19/02; F03C 5/00; F01B 19/00
[52] U.S. Cl. .................... 570/134; 60/531; 92/47
[58] Field of Search ............... 60/531; 570/134; 92/47

[56] References Cited

U.S. PATENT DOCUMENTS

| | | | |
|---|---|---|---|
| 2,639,189 | 5/1953 | Bragg et al. | 297/5 |
| 2,753,270 | 7/1956 | Di Renzo | 99/192 |
| 2,798,507 | 7/1957 | St. Clair | 92/47 |
| 3,664,698 | 5/1972 | Stropkay | 60/531 |
| 4,158,023 | 6/1979 | von Halasz | 570/123 |
| 4,341,075 | 7/1982 | Backlund | 60/531 |
| 4,551,943 | 9/1985 | Powell | 570/134 |
| 4,559,154 | 12/1985 | Powell | 570/134 |
| 4,821,517 | 4/1989 | Zarotti | 60/531 |

FOREIGN PATENT DOCUMENTS 0039471 11/1981 European Pat. Off. .
0117580 9/1984 European Pat. Off. .
2334125 1/1975 Fed. Rep. of Germany .

OTHER PUBLICATIONS

Derwent Publications Ltd., AN=80-83722C (47), Oct. 1980.

*Primary Examiner*—Joseph E. Evans
*Attorney, Agent, or Firm*—Connolly and Hutz

[57] ABSTRACT

2H-heptafluoropropane (HFC 227) is used as filler in sensor systems of temperature-sensitive displacement pickups.

1 Claim, No Drawings

FILLER FOR SENSOR SYSTEMS OF TEMPERATURE-SENSITIVE DISPLACEMENT PICKUPS

Mechanical switching elements having an adjustable temperature range, so-called temperature-sensitive displacement pickups, such as thermostats in domestic refrigerators and food freezers, in service water heaters heated by gas or electricity, or in hot water heating systems consist of a sensor element which is connected to a metal bellows via a capillary tube. The sensor element, capillary tube and metal bellows—termed "sensor system" below—is [sic] filled with a filler, generally a liquefied gas under pressure, If, for example, the sensor element mounted in the service water heater, and thus also the filler, is heated, its vapor pressure rises, resulting in an expansion of the metal bellows in the longitudinal direction. This expansion is used via a corresponding known arrangement to actuate a valve or to trigger a switching process directly or via a driven conductor. By varying a spring biasing which acts on the metal bellows, it can be achieved that the switching process is triggered at a higher or lower vapor pressure in the sensor system in accordance with a higher or lower temperature. Depending on the application, that is to say depending on the temperature range within which the switching temperature is to be variable, a suitable filler having an appropriate vapor pressure/temperature dependence is required in order that, on the one hand, the design requirements with respect to loadability in compression and spring biasing can be justified and on the other hand, however, that there is a sufficiently large quotient $\delta p/\delta t$ to ensure as low as possible a switching hysteresis between the heating and cooling processes.

Sulphur dioxide is known as filler for temperature-sensitive displacement pickups. Although the amounts filled per filler system are relatively small (between approximately 2 and 5 g depending on the type of switching element), there is a certain risk because of the unfavorable physiological properties of $SO_2$ in the case of damage to the sensor system and, above all, during the production of the sensor systems. There is, moreover, a duty to provide identification marking (reference to $SO_2$).

The object of the present invention therefore consists in finding a filler for sensor systems of temperature-sensitive displacement pickups which exhibits virtually the same operational performance but does not have the disadvantages indicated.

The object is achieved by using 2H-heptafluoropropane (HFC 227).

HFC 227 exhibits virtually the same operational performance as $SO_2$, is largely inert chemically, and in the temperature range (approximately $-30°$ to $+100°$ C.) of interest has a very good material compatibility with all metallic materials normally used for sensor systems.

We claim:

1. Use of 2H-heptafluoropropane as filler for sensor systems of temperature-sensitive displacement pickups.

* * * * *